(No Model.) 5 Sheets—Sheet 4.
C. H. PALMER, J. W. DENMEAD & J. A. BAUGHMAN.
BOX FILLING MACHINE.
No. 538,535. Patented Apr. 30, 1895.
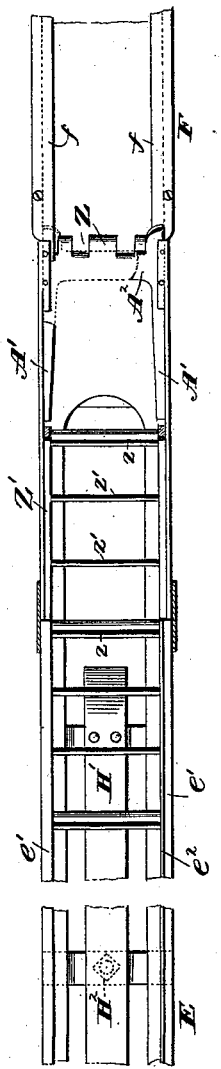
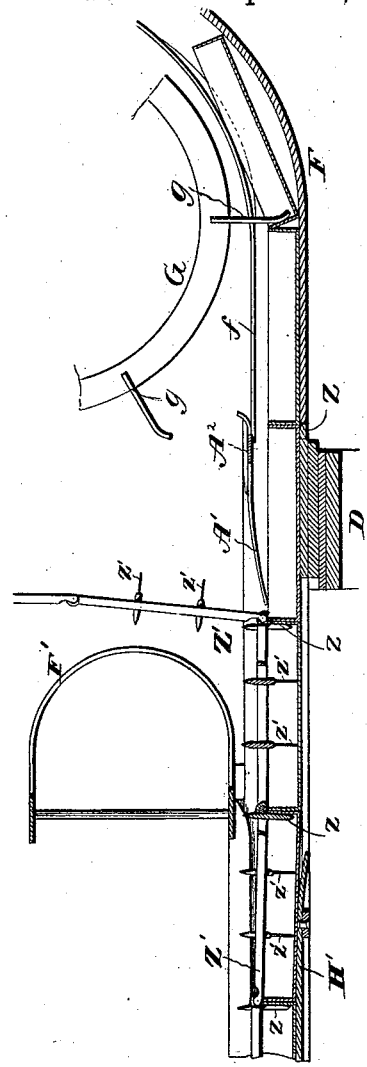
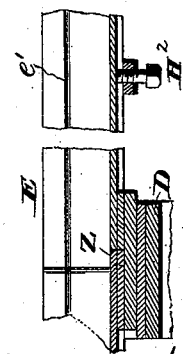
Witnesses
Chas. J. Williamson
Jas. C. Hutchinson
Inventors
Chas. H. Palmer, Jno. W. Denmead
and Jos. A. Baughman, by
Prindle and Russell, their Attorneys
THE NORRIS PETERS CO., PHOTO-LITHO., WASHINGTON, D. C.

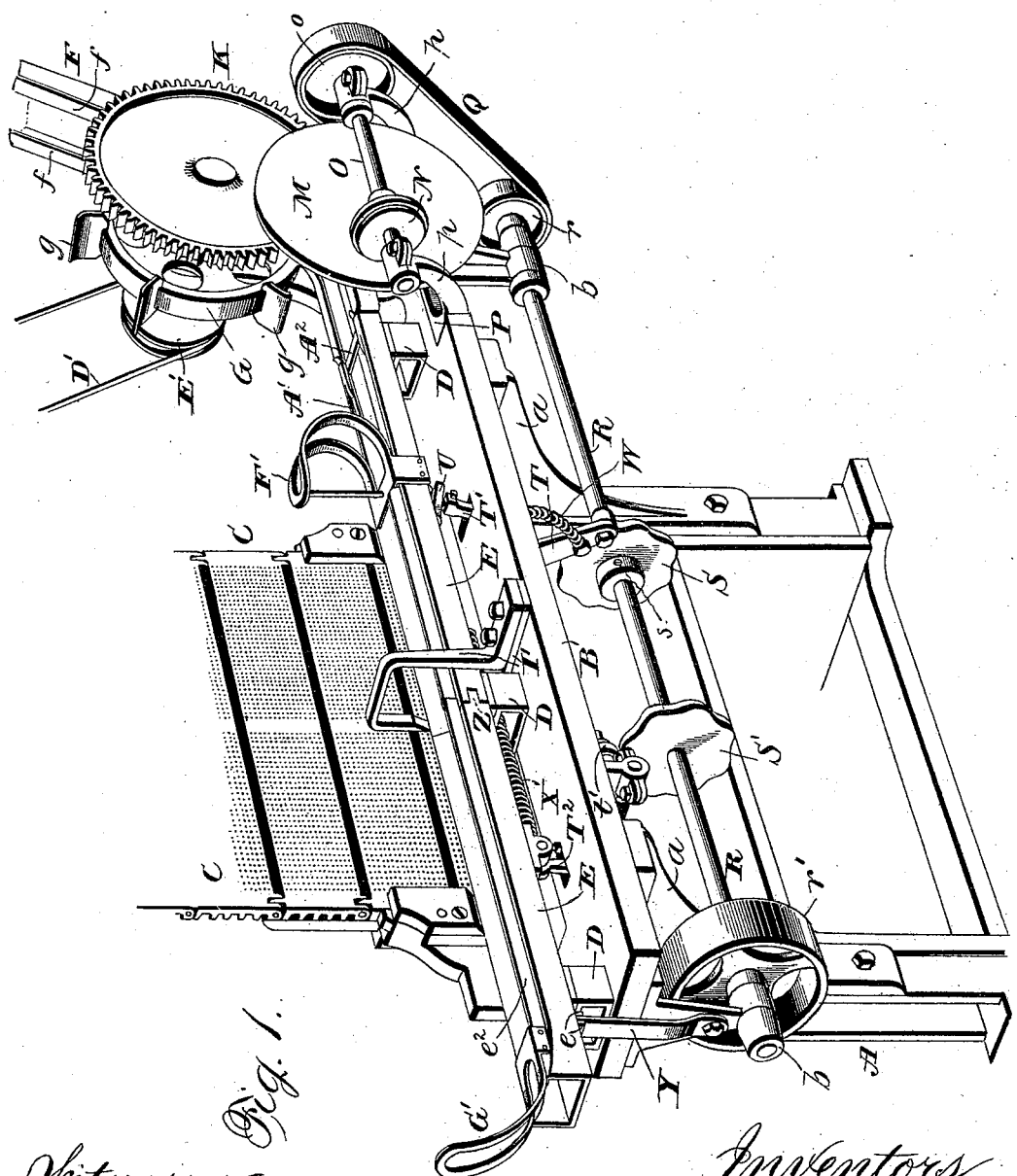

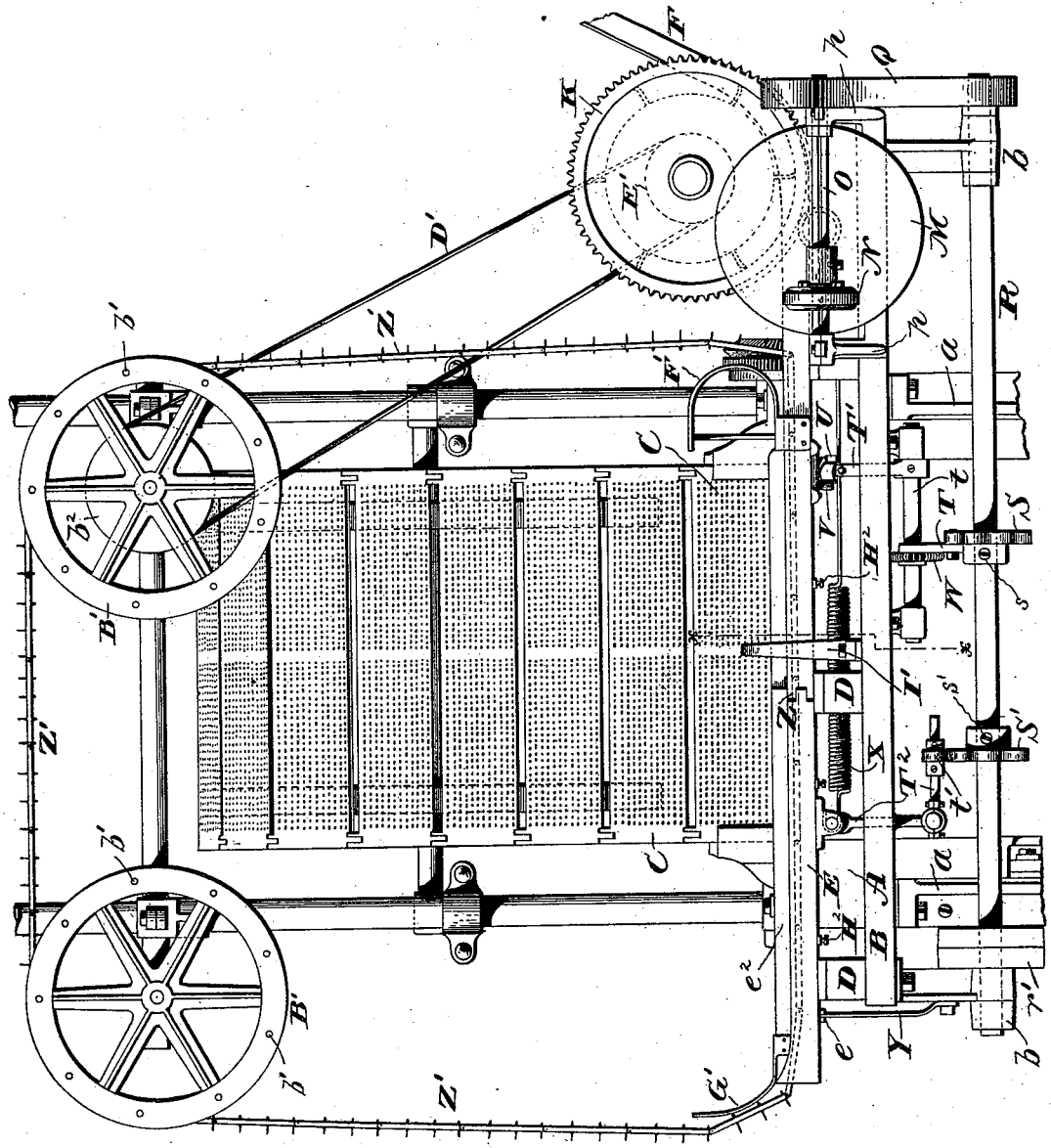

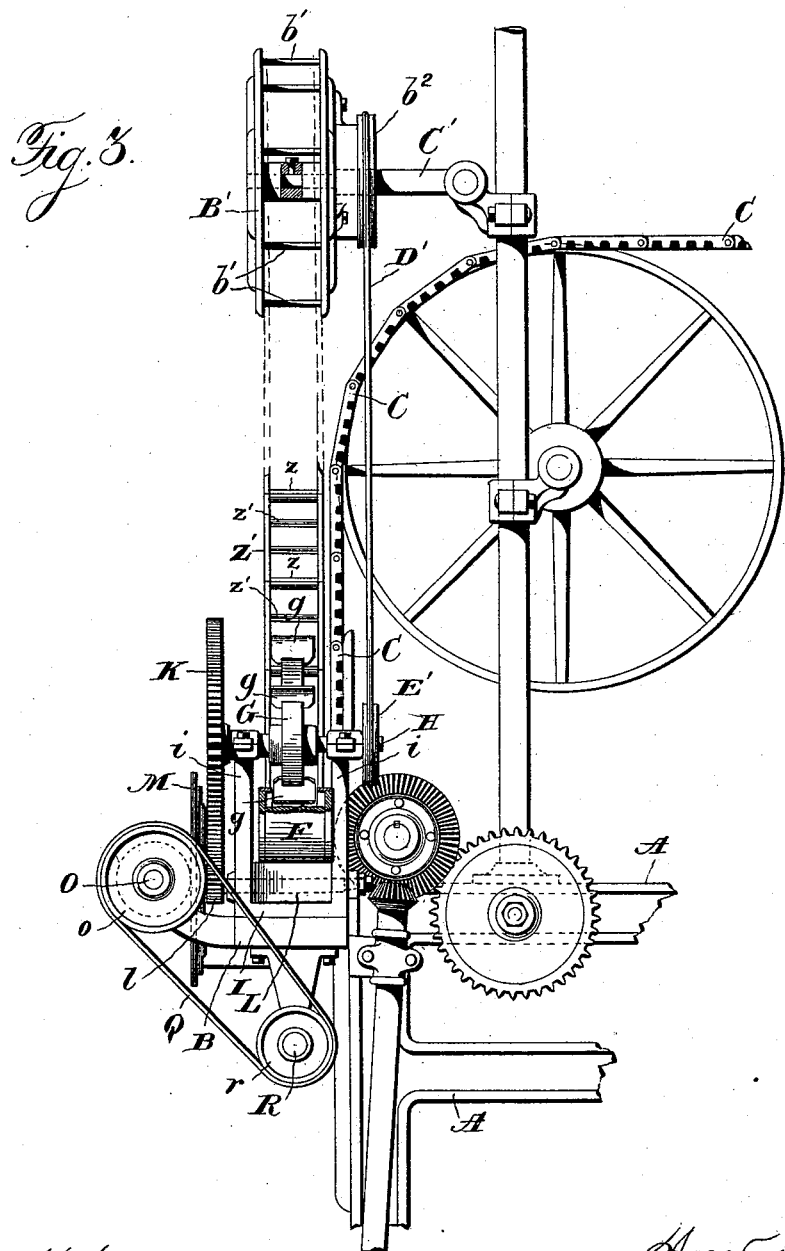

(No Model.) 5 Sheets—Sheet 5.
C. H. PALMER, J. W. DENMEAD & J. A. BAUGHMAN.
BOX FILLING MACHINE.
No. 538,535. Patented Apr. 30, 1895.
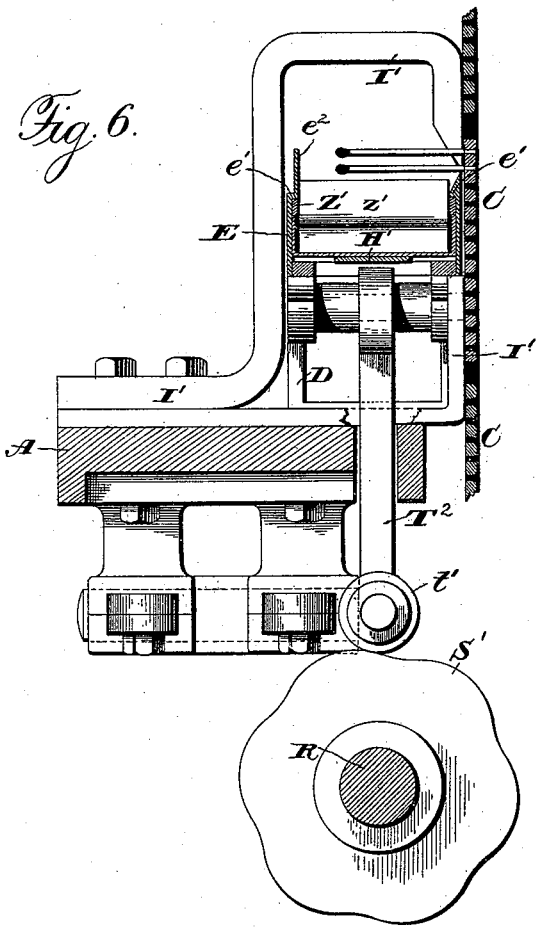
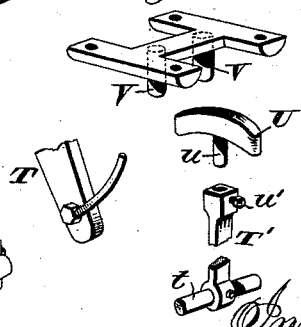
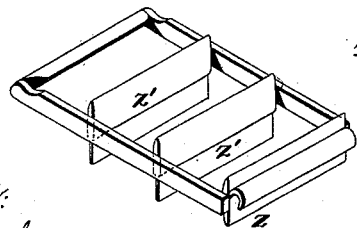

UNITED STATES PATENT OFFICE.

CHARLES H. PALMER, JOHN W. DENMEAD, AND JOSEPH A. BAUGHMAN, OF AKRON, OHIO, ASSIGNORS TO THE DIAMOND MATCH COMPANY, OF CHICAGO, ILLINOIS.

BOX-FILLING MACHINE.

SPECIFICATION forming part of Letters Patent No. 538,535, dated April 30, 1895.

Application filed November 30, 1894. Serial No. 530,447. (No model.)

*To all whom it may concern:*

Be it known that we, CHARLES H. PALMER, JOHN W. DENMEAD, and JOSEPH A. BAUGHMAN, of Akron, in the county of Summit, and in the State of Ohio, have invented certain new and useful Improvements in Box-Filling Machines; and we do hereby declare that the following is a full, clear, and exact description thereof, reference being had to the accompanying drawings, in which—

Figure 1 is a perspective view of our box-filling machine as arranged for use, the partition-carrying chain being removed. Fig. 2 is a front elevation of said machine. Fig. 3 is a side elevation of the same. Fig. 4 is a detail plan view of a portion of the box chute and trough. Fig. 5 is a longitudinal section through the same. Fig. 6 is a transverse section on line $x\,x$ of Fig. 2. Fig. 7 is a detail perspective view of a portion of the partition-carrying chain, and Fig. 8 is a detail perspective view of one form of trough-vibrating mechanism which we employ.

Letters of like name and kind refer to like parts in each of the figures.

The object of our invention is to enable matches to be successfully placed in boxes, by mechanical means, directly from the match making machine, and to this end, said invention consists in the mechanism, and in the construction and combination of the parts thereof, substantially as and for the purpose hereinafter specified.

To illustrate our invention, we will show and describe it as employed in connection with the well known form of match machine, which is known as the continuous machine, and an example of which is shown in United States patent to E. B. Beecher and J. P. Wright, No. 528,457, of October 30, 1894; but we, of course, do not limit ourselves only to the use of our invention in connection with such machines, or, in fact, with any particular construction of match machine.

In the type of machine referred to, the match-splints, after being cut, are stuck into openings in plates that are flexibly united into an endless chain, which, after carrying them to the devices for applying paraffine and the igniting composition, eventually returns them to a point near which the splints are cut, at which point they are discharged from the machine by being punched from the chain-plates.

In the carrying of our invention into practice, we attach to the frame A of the match machine, by means of brackets $a$ and $a$, a horizontally arranged base plate or support B, that is located a suitable distance below the point where the matches are punched from the chain-plate C, and extends entirely across the end of the machine. Upon the upper side of said plate are secured several blocks D and D, that form bearings or supports for a vibrating trough or way E, which extends crosswise of the machine, and has its inner side placed as close to the contiguous match holding plate C, as is possible without actual contact. Into and through said trough, whose construction will be hereinafter described, match-boxes are passed from a suitable source of supply, the connection with the latter and said trough being a chute F that has a downwardly inclined portion, through which the boxes descend by gravity, and a horizontal portion, that is in alignment with the trough, the chute between the inclined and horizontal portions being rounded or curved, as shown. Said chute has, on the upper edge of each side, an inwardly projecting flange $f$ to keep the boxes from accidental displacement, as they pass along through the same. The boxes are moved through the horizontal portion of the chute, into and through the trough or way E, by means of a feed-wheel G, that has a series of radial arms or fingers $g$ and $g$, that reach into and pass through the chute, as the wheel revolves, and engage, in succession, the front ends of the boxes on their inner sides, adjacent ones of said arms, being spaced a distance apart equal to the length of a box.

The feed-wheel G is mounted upon a shaft H that is journaled in arms $i\,i$, which rise from a plate I that is secured to the supporting plate B, and upon the outer end of said shaft is a gear-wheel K that meshes with a pinion $l$ upon a shaft L, that also carries a disk M. The outer face of said disk is a perfectly flat or plane one, and frictionally engaging the same is the periphery of a wheel N that is mounted upon a shaft O, which is journaled at its ends within bearings upon the arms $p$ and $p$, of a bracket P that is attached to the front edge of the plate B, at one end thereof. The friction-wheel N is splined upon its shaft, and is adjustable thereon to change, in a radial direction with reference to disk M the point of its engagement with such disk M, and thus enable the speed of the latter and, in consequence, that of the feed-wheel G, to be changed. At its outer end, the shaft O carries a pulley $o$ that is connected by a belt Q with pulley $r$ upon the end of a shaft R, which is journaled in brackets $b$ and $b$, that depend from the under side of the plate B, and which shaft R carries at its other end, a band wheel $r'$ to which power may be applied from any suitable source, to rotate the shaft.

The trough or way through which the boxes are passed to receive the matches discharged from the chain plates C and C, has a rapid vibratory movement imparted to it, to cause the matches to settle into and thus fill the boxes, and lie therein parallel with each other; and said trough or way may be in one piece; but, by preference, we make it in two pieces or sections, and provide a separate vibrating mechanism for each section. This construction is desirable, since it is advisable to impart less motion to the boxes that are nearly filled, than to those less filled, so as to avoid the likelihood of displacing or throwing out the matches. The motion imparted to the trough sections is in a longitudinal direction, and may be produced by any suitable means. In the drawings we show a different form applied to each, either or both of which may be employed at the same time in one machine. In each form, a cam-wheel, having numerous cam projections on its periphery, and fixed upon shaft R by a set screw tapped through its hub and engaging the shaft, is used to vibrate a lever, which is connected with the respective trough-section, so as to cause the desired jarring or vibration of the same. In one form a lever T is mounted upon a shaft $t$, that carries an upwardly extending arm $T'$, to the upper end of which is attached a bar U that stands at an angle oblique to the plane of vibration of the arm and is engaged upon opposite sides by pins or studs V and V, that project downward from the under side of the trough section. The outer end of lever T, or a roller thereon engages the periphery of the cam-wheel S, having numerous projections on its periphery, and fixed to the shaft R by means of set screw $s$ tapped through its hub, as shown. To vary the amount of movement of the trough-section, said bar U is adapted to be adjusted to change the angle of its obliquity, being, to this end, provided with a shank $u$ that fits and is held within an opening in said arm $T'$, by means of a set screw $u'$. The lever T is moved, in opposition to the cam-wheel S, by means of a spring W, that, at one end, engages said lever, and, at its other end, engages the under side of the plate B. The lever $T^2$ of the other vibrating mechanism shown, is a bell-crank-lever, and has one arm actuated by the cam-wheel $S'$ like cam-wheel S already described, and similarly secured to the shaft R by a set screw $s'$ and the other arm extended upward, and pivoted to the under side of the trough section. A coiled spring X, attached at one end to said lever $T^2$ and at its other end to a relatively fixed point, acts to move said lever and the trough-section, in opposition to the cam-wheel. The bell-crank-lever $T^2$ does not directly engage the cam-wheel, but is provided with a roller or wheel $t'$ and said roller is made adjustable along the lever-arm to vary the throw of the lever, and hence, the amount of movement of the connected trough-section. As the roller is adjusted along the lever, the cam $S'$ can be correspondingly moved along its shaft R, and fixed at the required point by the set screw $s''$ which fastens it to the shaft.

To cushion the trough or way in its vibration, and modify its momentum, a flat spring Y is employed, that is secured at one end to one of the brackets $b$, and has its upper free end placed between lugs $e$ and $e$, upon the under side of the trough E.

Both where the chute F adjoins the trough, and where the two sections of the latter come together, the parts are provided with interlocking fingers Z and Z, of greater length than the throw of the trough; so as to avoid the formation of a space between the adjacent ends of the sections and chute, of such width as to interfere with the free passage of the boxes at such point. The surfaces of the trough section-ends toward which the boxes move, are rounded off, as shown, to avoid the presence of shoulders or abrupt places against which the box ends might catch. For a like reason, the sides of the two trough sections, also, are formed with similar interlocking fingers, and though said construction is not shown as employed where the sides of the chute and trough come together, it, of course, can be so used, without departure from our invention.

Where the boxes to be filled are of greater length than the length of the matches, it has been found that, occasionally, instead of occupying positions lying straight across the box, which is the designed position, and that necessary to properly fill the box, matches will get awry therein. To prevent this, we employ what may be termed temporary partitions, to divide such boxes, as they pass through the trough, into several compartments having each a length less than that of a match, so as to confine the limits in which it is possible for the match to move horizontally, and act, upon being struck by matches, to guide or direct the same to the desired position. In practically embodying this feature, we employ an endless chain $Z'$ each of whose links has the form of a parallelogram, and generally corresponds in length and width with the like dimensions of the box used, and, at one end, has a thin projection $z$ to extend into a box, and engage the inner side of the rear end thereof, the object of such projection being to preserve a link and its box in proper relative position. Between its ends, each link has several, as shown, two, other projections $z'$ and $z'$ in the form of very thin plates, that are adapted to extend into the match boxes, to the bottom thereof, and, having a width corresponding to that of the box, constitute the temporary partitions above referred to. Preferably, the dimensions of each projection $z$ and $z'$ are such, that, when a link is in engagement with a box, the upper edges of each of said projections will stand higher than the top of the box, so as to control matches falling into nearly full boxes, and, in the case of the end projections $z$ and $z$, prevent their lodging upon the upper edges of the ends of the boxes. Even in the case of small boxes, which do not necessitate the employment of the intermediate partitions $z'$ and $z'$, it has been found desirable to employ a chain whose links have merely the described construction of end partitions, for the purpose of guiding the matches into orderly positions in each box, and to keep them there, when they fall into boxes that have been nearly filled. We, therefore, wish it understood, that we do not limit ourselves only to the use of a link having projections intermediate its ends; and we also wish it understood, that we do not confine ourselves to the employment of the chain; as, under some conditions, we may dispense with it and the partitions altogether, although we deem it an important and valuable device. Said chain is, also, of great utility, where the form of box to be filled is such that the filling cannot be done directly from the machine as they are passed through the trough, since the matches can be dropped into and moved through the trough in an orderly position by the projections on the chain.

In passing through the trough E, the sides of the chain rest upon the top edges of the box sides, and the flanges or shoulders $e'$ and $e'$, upon opposite sides of the trough, overhang and engage the top edges of the chain, to steady the latter and the boxes under the vibratory motion of the trough. The inner face of the trough side adjacent to the match carrying plates, is beveled or inclined, as shown, from its top to the shoulder $e'$ upon such side, so as to offer no impediment to the descent of matches into the boxes; while, to prevent the jumping of matches clear across the trough, when expelled with unusual force from the plates, a guard plate $e^2$, is provided upon the opposite side of the trough, which rises vertically from the shoulder or flange $e'$ upon said side.

The flanges $e'$ and $e'$, are omitted at the end of the trough into which the boxes pass from the chute F, to permit the entrance into the trough of the chain; and to prevent the boxes rising or jumping out of the trough, as they enter the same from the chute, a spring finger A' is provided, at each side, to yieldingly bear upon the top edge of the box side. Said fingers are integral with and project from a transverse plate $A^3$ that is suitably attached to the trough, and have such length, as to extend to the point where the links enter into engagement with the boxes.

The chain Z' passes over two wheels B' and B' that are journaled upon arms C' and C', at opposite sides of the match machine frame, at points above the trough, each of said wheels being formed of two rings or disks, that are united by parallel rods $b'$ and $b'$, with which the link projections $z$ and $z$ are adapted to engage. Preferably the chain is driven otherwise than by its heretofore described engagement with the boxes, and for this purpose we connect by means of a belt or band D' a pulley $b^2$ that is attached to one wheel B', with a pulley E', upon the feed wheel shaft H. In moving into the trough, the chain Z' is guided by a curved guide-plate F', that is attached to the trough, and a like guide-plate G' is provided, where it passes out of the trough. To keep the boxes from sliding or slipping, within the trough, as the same vibrates, we provide means for applying pressure to them while therein, which means consists of a thin elastic plate H' for each trough section, that is secured at its ends at the bottom thereof, and is adapted to be adjusted, by means of a set screw $H^2$, to vary the level of a portion of its length between its ends, and thus cause such boxes, as pass over the adjusted portion, to be held with sufficient friction to avoid its slipping.

Contact of the chain-plates with the trough, which would, of course, interfere with the vibration thereof, is prevented by bracing or supporting the same both above and below the trough, against outward movement, by means of two arms or bars I' and I', that are bolted to the plate B, one of which arms arches over the trough, and has a vertical downward extension that engages the chain-plates, and the other of which passes under the trough, and has a vertical, upward extension that engages said plates.

The operation of our invention is as follows: Boxes being passed into and down the chute F, are caught by the feed-wheel G, and passed, in a continuous procession, end to end, into and through the trough, at such rate of speed, relative to the rate of discharge of matches from the match machine, that a box will be filled in its transit across the field of discharge. Subjected, as they are, to a constant vibration, the matches will be settled into and arranged in an orderly regular manner within the boxes, a result contributed to by the employment of the temporary partitions, of the chain Z', whose links enter the trough and engage the boxes before the latter reach the point where matches are being discharged from the chain-plates, and continue with them, until they have passed beyond such place of discharge, when both they and the filled boxes leave the trough and separate. The portions of the partitions $z'$, $z'$, which are to extend down into the boxes being filled, are in the form of thin flat plates, while their upper portions, being made slightly thicker, taper toward their upper edges, so as to have the appearance of wedges, with their edges situated in line above the lower thin flat portions of the partitions. With this construction, as the matches fall from the carrier chain plates, they will, upon striking the inclined surfaces on the upper parts of the partitions, be guided into proper position to lie straight across within the box below.

The sides of the wedge-shaped upper parts can be made on a straight or rounded bevel, as desired.

With our invention, the matches are placed directly in the boxes, from the match making machine. The mechanism is simple; and practical tests have demonstrated it to be most satisfactory, both as to efficiency and rapidity in doing its work.

Having thus described our invention, what we claim is—

1. In a machine for boxing matches, in combination with a source of supply of the matches to be boxed, a support to hold the box in position to receive the matches from the source of supply, and means for giving the box a to and fro jarring motion, in a direction out of a vertical line, and substantially at right angles to the matches as they are to lie in the box, substantially as and for the purpose specified.

2. In a machine for boxing matches, in combination with a source of supply of the matches to be boxed, means for passing a box across the path of the matches from such source of supply and a jarring device to give the box a to and fro longitudinal jarring in a direction substantially at right angles to the matches as they are to lie in the box, substantially as and for the purpose shown.

3. In a machine for boxing matches, in combination with a source of supply of the matches to be boxed, means for passing the boxes across the stream of matches from such source, so that they will be gradually filled, as they pass along, and means for jarring the boxes, while being filled, in a direction out of a vertical line and substantially at right angles to the matches as they are to lie in the filled boxes, substantially as and for the purpose set forth.

4. In a machine for boxing matches, in combination with a source of supply of the matches to be boxed, means for passing a series of boxes placed close together, across the stream of matches from the source of supply, so that several of the boxes will be receiving matches at a time, and means for giving the boxes, as they pass along, a series of jars in a direction out of a vertical line and at right angles to the matches, as they are to lie in the filled boxes, substantially as and for the purpose described.

5. In a machine for boxing matches, in combination with a source of supply of the matches to be boxed, a support for the boxes over which the latter are moved in a direction across the stream of matches from the source of supply, means for moving the boxes over such support, and means for giving such support a to and fro jarring motion in a direction substantially at right angles to the matches, as they are to lie in the filled boxes, substantially as and for the purpose specified.

6. In a machine for boxing matches, in combination with a support for the box and means for moving the box over the same, means for jarring the support longitudinally with reference to the travel of the box over the support, substantially as and for the purpose described.

7. In a machine for boxing matches, in combination with a support over which the box is moved, means for filling the box, and means for jarring the support longitudinally with reference to the travel of the box over it, and in a direction substantially at right angles to the position which it is desired that the matches shall assume in the filled box, substantially as and for the purpose specified.

8. In a box filling machine, in combination with a trough to hold the boxes to be filled, means for reciprocating such trough longitudinally, substantially as and for the purpose described.

9. In a box filling machine, in combination with a trough to hold the boxes to be filled, means for moving the boxes through such trough, and means for giving the latter a series of longitudinal reciprocations, substantially as and for the purpose specified.

10. In combination with a source of supply of matches, a trough extending across the path of the matches from such source, in a direction substantially at right angles to the matches, means for moving the boxes along in the trough, and means for giving the latter a series of longitudinal reciprocations, substantially as and for the purpose shown.

11. In a box filling machine, in combination with a source of supply of the material to be boxed, the trough through which the boxes to be filled are moved, divided transversely into separate parts, and separate jarring devices for such parts, adapted to give the part of the trough through which the boxes first pass a greater jarring motion than the other, substantially as and for the purpose set forth.

12. In a box filling machine, in combination with a source of supply of the material to be boxed, the trough extending across the path of the material from such source of supply, and divided transversely into separate parts, means for moving the boxes through the trough, and jarring devices for the respective parts of the trough, whereby that part through which the boxes first pass, is given greater jarring motion than the other part, substantially as and for the purpose described.

13. In a box filling machine, in combination with a trough through which the boxes are passed, means for holding the boxes from rising, as they pass through the trough, an adjustable friction device to engage the bottoms of the boxes, and means for jarring the trough longitudinally, substantially as and for the purpose specified.

14. In a box filling machine, in combination with a trough through which the boxes are passed, means for holding the boxes down in the trough as they pass through the same, a plate to engage the bottoms of the boxes, means for adjusting such plate to regulate the amount of friction on the boxes and means for jarring the trough longitudinally, substantially as and for the purpose shown.

15. In a box filling machine, in combination with a trough through which the boxes are passed, a spring plate engaging the under sides of the boxes, and means for jarring the trough longitudinally, substantially as and for the purpose specified.

16. In a box filling machine, in combination with a trough section through which the boxes are passed, two pins or lugs connected with the trough, a swinging arm, an inclined bar carried by the latter, engaging the pins, and means for swinging such arm, substantially as and for the purpose shown.

17. In a box filling machine, in combination with a trough section through which the boxes are passed, two pins or lugs connected with such trough, a swinging arm, means for swinging the same transversely with reference to the trough, and the inclined bar adjustably attached to the swinging arm, so that its angle, with reference to the swing of the arm, may be varied, substantially as and for the purpose set forth.

18. In a box filling machine, in combination with a trough section through which the boxes are passed, pins or lugs connected with the trough, the arm swinging transversely with reference to the trough, the inclined bar carried by such arm and engaging the pins or lugs on the trough, the rock shaft to which such arm is attached, the cam wheel, a second arm on the rock shaft, having a bearing engaging the cam wheel, and a spring forcing such arm toward the wheel, substantially as and for the purpose described.

19. In a box filling machine, in combination with a trough section through which the boxes are passed, a transverse rock-shaft having two arms swinging in a plane longitudinal with reference to the trough section of which one has its free end connected with the latter, a cam wheel, means carried by the second arm on the rock-shaft, to engage the cam surfaces on the wheel, and a spring tending to swing the first arm in a direction opposite to that in which the cam moves it, substantially as and for the purpose specified.

20. In a box filling machine, in combination with the chute down which the boxes are fed, the rotating feed wheel having fingers to engage the inner side of the forward ends of the boxes, substantially as and for the purpose shown.

21. In a box filling machine, in combination with a chute through which the boxes are fed, and a support over which the boxes pass from the chute, the rotating feed wheel having fingers to engage the inner sides of the forward ends of the successive boxes, so as to force the same along through the chute and over the support for the moving boxes, substantially as and for the purpose set forth.

22. In a box filling machine, in combination with the chute for the boxes, and the trough through which they are to be moved, the means for feeding the boxes from the chute into and through the trough, which consists in a rotating wheel having fingers adapted to engage the inner sides of the forward ends of the successive boxes, and force them forward, substantially as and for the purpose described.

23. In a box filling machine, in combination with a suitable support over which the boxes are moved, and means for so moving them, a series of removable transverse partitions for each box arranged to divide the space within a box up into several divisions, into which the matches can fall from above the box and a moving carrier carrying such partitions along with the boxes, substantially as and for the purpose specified.

24. In a box filling machine, in combination with a suitable support for the boxes, and means for moving the latter along, a series of transverse plates for each box projecting above the level of the box edges, and so situated as to divide the space just above each box into several divisions, and a moving carrier carrying such plates along with the boxes, substantially as and for the purpose shown.

25. In a box filling machine in combination with a suitable support for the boxes to be filled, and means for moving them along, a moving carrier traveling with the boxes, having a series of plates for each box, with wedge-shaped upper portions situated above the tops of the boxes, so as to divide the space just above each box into several divisions, substantially as and for the purpose described.

26. In a box filling machine, in combination with a suitable support for the boxes to be filled, and means for moving them along, a moving carrier having a series of transverse plates for each box extending down into and above the box, and arranged relatively, so as to divide the space within and just above the box into several divisions, substantially as and for the purpose specified.

27. In a box filling machine, in combination with a support for the boxes to be filled, a moving chain of links each having a plate to project into a box and engage the inner side of one of its ends, substantially as and for the purpose shown.

28. In a box filling machine, in combination with a support for the boxes to be filled, a moving chain of links each having a plate to project into a box and engage the inner side of one of its ends, such plate having a portion extending up above the box engaging part, substantially as and for the purpose set forth.

29. In a box filling machine, in combination with a support for the boxes to be filled, a moving chain of links each having a plate to project down into a box in contact with the inner side of an end of the box, and an upwardly projecting part made wedge-shaped at its top, substantially as and for the purpose described.

30. In a box filling machine, in combination with a support for the boxes to be filled, a moving chain of links, each having one or more transverse plates adapted to project down into a box and divide the interior of the latter up into several divisions into which the matches can fall, from a source of supply above the boxes, substantially as and for the purpose specified.

31. In a box filling machine, in combination with a source of supply of the matches to be boxed, and a suitable support for the boxes, a moving chain of links, one for each box to be filled, each having several transverse upwardly projecting plates over the respective boxes, arranged so as to divide the space above the respective boxes into several divisions into which the matches can fall from a source of supply, and means for causing the chain of links to move with the boxes, substantially as and for the purpose specified.

32. In combination with a support for the boxes to be filled, a moving chain of links, each having a projecting part to engage the inner side of one end of a box, and one or more transverse partition plates projecting down into the box, situated so as to divide the box interior into separate divisions, and means for moving the boxes along, substantially as and for the purpose set forth.

33. In combination with a support for the boxes to be filled, a moving chain of links each having a projection to engage the inner side of an end of one of the boxes, and one or more transverse partition plates to extend down into the interior of the box, having their upper portions extending above the box provided with an edge and oppositely inclined faces on opposite sides of such edge, and means for moving the boxes along, substantially as and for the purpose described.

34. In a box filling machine in combination with the box receiving trough with overhanging longitudinal shoulders, means for moving the boxes through the trough, and the chain of links, each provided with a projection to engage the inner side of one end of a box, and one or more partitions to project down into a box and divide up its interior, substantially as and for the purpose specified.

35. In a box filling machine, in combination with the box receiving trough with overhanging longitudinal shoulders, means for moving the boxes through the trough, the moving chain of links each carrying transverse partition plates, to project down into the interior of a box, arranged so as to divide up the same into small divisions adapted to receive matches falling from a source of supply above the box, and guiding and supporting devices for such chain to guide it into the trough with the boxes, and raise it from the latter beyond the end of the trough, substantially as and for the purpose shown.

36. In a box filling machine, in combination with the trough with overhanging longitudinal shoulders, means for moving the boxes through the trough, a moving chain of links, each having a projection to engage the inner face of the rear end of a box, and transverse plates with wedge-shaped tops projecting above the top of the box, and suitable supports and guides for the chain to guide it into the trough with the boxes so that it will come between the upper edges of the latter, and the longitudinal shoulders on the trough, and then cause it to rise away from the boxes at a point beyond the rear end of the trough, substantially as and for the purpose set forth.

37. In combination with the trough and means for feeding the boxes to be filled to and through such trough, a moving chain of links each having the transverse division plates for the respective box, a spring plate to hold the boxes down in place, as they pass to the point where the chain of links enters the trough, longitudinal shoulders on the trough, to hold the chain down in place on the boxes, as it moves along, a guide to guide the chain to the trough, supporting and actuating wheels to guide the chain upward from the boxes beyond the trough end, and return it to the entrance of the trough again, and means for rotating one or more of these wheels, substantially as and for the purpose described.

In testimony that we claim the foregoing we have hereunto set our hands this 22d day of November, 1894.

CHARLES H. PALMER.
JOHN W. DENMEAD.
JOSEPH A. BAUGHMAN.

Witnesses:
GERTRUDE FOSTER,
EDWIN F. VORIS.